(12) United States Patent
Chien et al.

(10) Patent No.: US 11,867,930 B2
(45) Date of Patent: Jan. 9, 2024

(54) FILTER MODULE AND PROJECTION APPARATUS

(71) Applicant: Coretronic Corporation, Hsin-Chu (TW)

(72) Inventors: Cheng-Che Chien, Hsin-Chu (TW); Ming-Tsung Weng, Hsin-Chu (TW); Sheng-Chiang Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 75 days.

(21) Appl. No.: 17/386,515

(22) Filed: Jul. 27, 2021

(65) Prior Publication Data
US 2022/0035081 A1 Feb. 3, 2022

(30) Foreign Application Priority Data
Jul. 30, 2020 (CN) .......................... 202010748579.5

(51) Int. Cl.
*G02B 5/02* (2006.01)
*G02B 13/16* (2006.01)
(Continued)

(52) U.S. Cl.
CPC ............ *G02B 5/0294* (2013.01); *G02B 5/20* (2013.01); *G02B 13/16* (2013.01); *G02B 21/14* (2013.01)

(58) Field of Classification Search
CPC . G02F 1/00; G02F 1/01; G02F 1/0105; G02F 1/1335; G02F 1/133504; G02F 1/133507; G02F 1/133514; G02F 1/133509; G02F 1/133528; G02F 2203/11; G02F 2203/05; G02F 2203/00; G02F 1/133512;
(Continued)

(56) References Cited

U.S. PATENT DOCUMENTS

| | | | |
|---|---|---|---|
| 9,310,622 B2* | 4/2016 | Egawa | F21S 10/007 |
| 2019/0004409 A1* | 1/2019 | Nishikawa | G03B 21/204 |

FOREIGN PATENT DOCUMENTS

| | | |
|---|---|---|
| CN | 204009242 | 12/2014 |
| CN | 105573031 | 5/2016 |

(Continued)

OTHER PUBLICATIONS

"Office Action of China Counterpart Application", dated Jul. 1, 2022, p. 1-p. 11.

*Primary Examiner* — William Choi
*Assistant Examiner* — Ray Alexander Dean
(74) *Attorney, Agent, or Firm* — JCIPRNET

(57) ABSTRACT

A filter module and a projection apparatus are provided. The filter module includes a filter layer and a diffusion layer. The filter layer includes a first filter region and a second filter region, which respectively allow light having a first waveband and light having a second waveband to pass through. The diffusion layer is disposed on a side of the filter module opposite to the filter layer and includes a first diffusion portion with a first haze value and a second diffusion portion with a second haze value. The first diffusion portion is disposed corresponding to the first filter region and allows the light having the first waveband to pass through. The second diffusion portion is disposed corresponding to the second filter region and allows the light having the second waveband to pass through. The first haze value is different from the second haze value.

15 Claims, 3 Drawing Sheets

(51) Int. Cl.
*G02B 5/20* (2006.01)
*G02B 21/14* (2006.01)

(58) Field of Classification Search
CPC ............. G02F 1/13356; G02F 2203/58; G02B 5/0294; G02B 5/20; G02B 13/16; G02B 21/14; G02B 5/021; G02B 26/008; G02B 19/0047; G02B 5/26; G02B 6/29361; G02B 2006/12116; G03B 21/204; G03B 21/208
See application file for complete search history.

(56) References Cited

FOREIGN PATENT DOCUMENTS

| | | |
|---|---|---|
| CN | 107850826 | 3/2018 |
| CN | 108255006 | 7/2018 |
| CN | 208172483 | 11/2018 |
| CN | 208752383 | 4/2019 |
| CN | 110764172 | 2/2020 |
| CN | 210142253 | 3/2020 |
| JP | 2004234001 | 8/2004 |
| TW | I584048 | 5/2017 |
| TW | I684820 | 2/2020 |

* cited by examiner

FILTER MODULE AND PROJECTION APPARATUS

CROSS-REFERENCE TO RELATED APPLICATION

This application claims the priority benefit of China application serial no. 202010748579.5, filed on Jul. 30, 2020. The entirety of the above-mentioned patent application is hereby incorporated by reference herein and made a part of this specification.

BACKGROUND

Technical Field

The invention relates to an optical module and an optical apparatus, and particularly relates to a filter module and a projection apparatus.

Description of Related Art

In recent years, projection apparatuses based on solid-state light sources such as light-emitting diodes (LEDs) and laser diodes (LDs) have gradually gained a place in the market. Since the laser diodes have a luminous efficiency higher than about 20%, in order to break through a limitation of the LEDs as a light source, projectors that use laser light sources as the light sources have been gradually developed.

Generally, a projection apparatus using a laser light source as the light source includes optical modules such as a light combining module, a filter module, a light uniforming element, a light valve, a projection lens (P-Lens), etc. To be specific, the filter module may be disposed at a post light path (a downstream light path) of the light combining module, so that color light of different wavebands from the light combining module may be filtered by the filter module to obtain predetermined color light, so as to purify a light color and achieve a color saturation effect. The color light purified by the filter module is then transmitted to the light uniforming element, and transmitted to the subsequent light valve, and is then projected to a screen through the projection lens.

However, if the color light passing through the filter module is not properly uniformed, or only uniforming processing of a single haze is adopted to process full-waveband light falling in a visible light band, it may only be able to eliminate the poor uniformity of the color light in a specific waveband range (such as blue light, red light or green light), but the uniformity of the color light outside the specific waveband range may still not meet the requirements of uniformity and color performance. For example, in a white image, if only the poor uniformity of blue light is eliminated, but the red or green light has poor uniformity, human eyes may easily detect the presence of non-uniformity of obvious red or green color blocks, which will affect the image quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a filter module, which makes color light of different waveband ranges to have good uniformity.

The invention is directed to a projection apparatus, which provides image frames with good quality.

Other objectives and advantages of the invention may be further illustrated by the technical features broadly embodied and described as follows.

In order to achieve one or a portion of or all of the objectives or other objectives, an embodiment of the invention provides a filter module. The filter module includes a filter layer and a diffusion layer. The filter layer includes a first filter region and a second filter region. The first filter region and the second filter region respectively allow light having a first waveband and light having a second waveband to pass through. The diffusion layer is disposed on a side of the filter module opposite to the filter layer and includes a first diffusion portion with a first haze value and a second diffusion portion with a second haze value. The first diffusion portion is disposed corresponding to the first filter region and allows the corresponding light having the first waveband to pass through, and the second diffusion portion is disposed corresponding to the second filter region and allows the corresponding light having the second waveband to pass through, and the first haze value is different from the second haze value.

In order to achieve one or a portion of or all of the objectives or other objectives, an embodiment of the invention provides a projection apparatus. The projection apparatus includes the above filter module, a light combining module, a light valve and a projection lens. The light combining module is configured to emit light having a first waveband and light having a second waveband, wherein the light having the first waveband and the light having the second waveband are transmitted to the filter module, and converted into an illumination light beam by the filter module. The light valve is located on a transmission path of the illumination light beam, and is configured to convert the illumination light beam into an image light beam. The projection lens is located on a transmission path of the image light beam, and is configured to project the image light beam out of the projection apparatus.

Based on the above description, the embodiments of the invention have at least one of following advantages or effects. In the embodiment of the invention, in the projection apparatus and an illumination system, based on corresponding configuration of different filter regions of the filter layer and different diffusion portions of the diffusion layer, the light with different wavebands passing through different filter regions may pass through the diffusion portions with different haze values. In this way, uniformity of the color light in different waveband ranges may be adjusted separately, so that each color light has good uniformity, and thus the subsequently formed illumination light beam has better uniformity. In this way, the illumination system and the projection apparatus using the filter module are able to provide display images with uniform color, thereby improving the image quality and user's visual perception.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
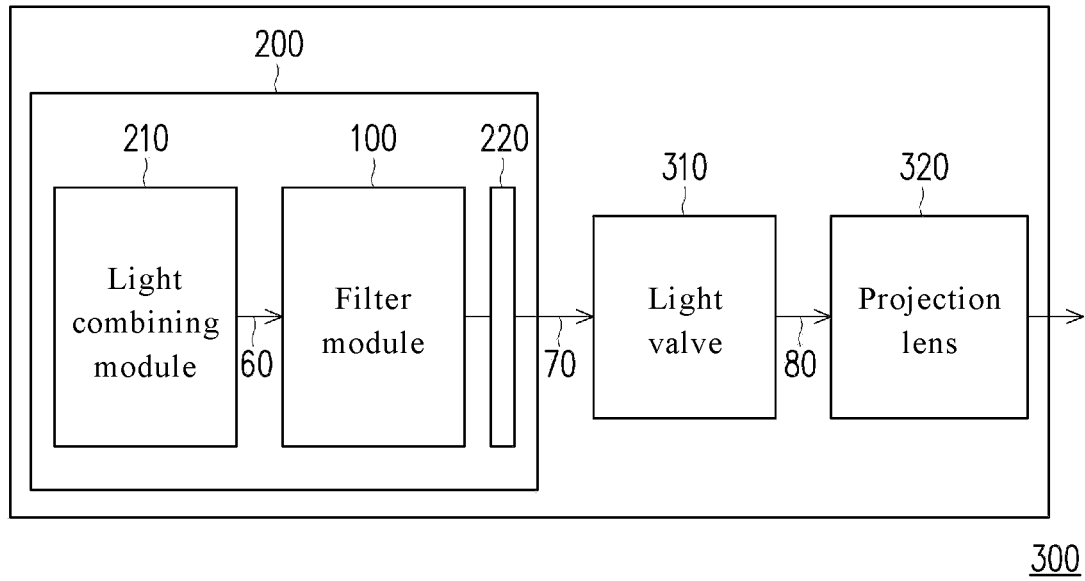
FIG. 1 is a block diagram of a projection apparatus according to an embodiment of the invention.
Figure 2:
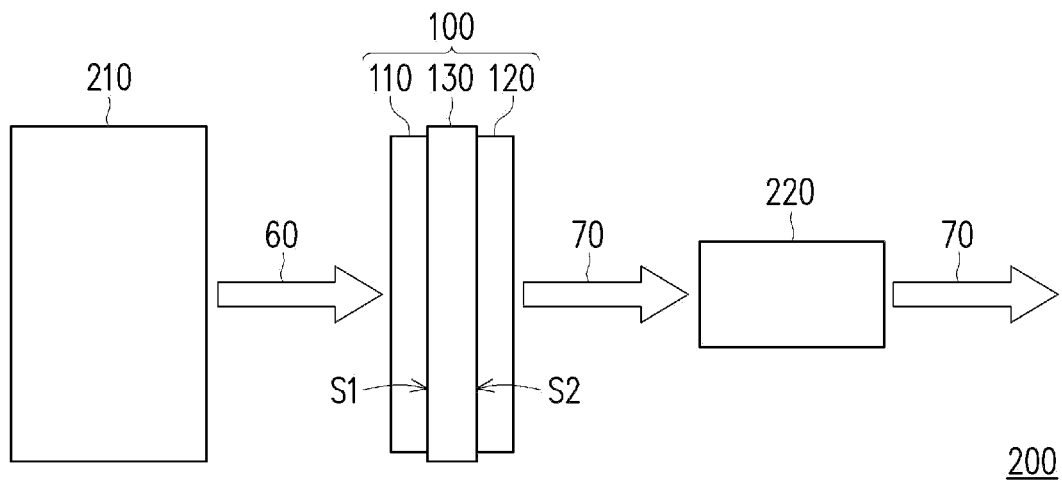
FIG. 2 is a structural schematic diagram of an illumination system according to an embodiment of the invention.
Figure 3:
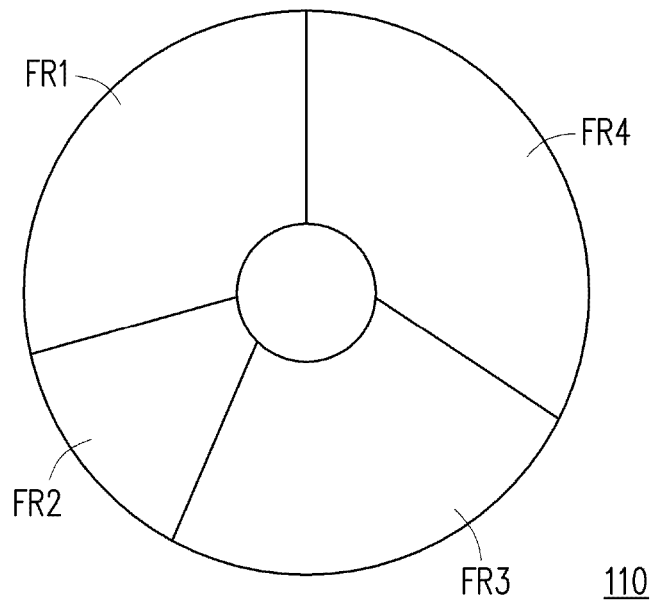
FIG. 3 is a top view of a filter layer of FIG. 2.
Figure 4:
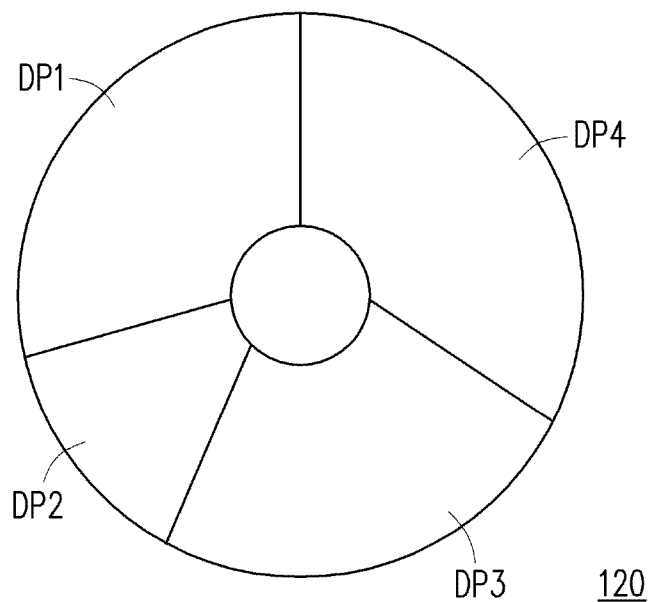
FIG. 4 is a top view of a diffusion layer of FIG. 2.

FIG. 1 is a block diagram of a projection apparatus according to an embodiment of the invention. FIG. 2 is a structural schematic diagram of an illumination system according to an embodiment of the invention. FIG. 3 is a top view of a filter layer of FIG. 2. FIG. 4 is a top view of a diffusion layer of FIG. 2. Referring to FIG. 1, in the embodiment, a projection apparatus 300 includes an illumination system 200, a light valve 310, and a projection lens 320. The illumination system 200 is configured to provide an illumination light beam 70. To be specific, as shown in FIG. 1 and FIG. 2, the illumination system 200 includes a light combining module 210, a filter module 100, and a light uniforming element 220. The filter module 100 is located between the light uniforming element 220 and the light combining module 210.

To be more specific, as shown in FIG. 2, in the embodiment, the light combining module 210, for example, has a light source device (not shown) and is configured to emit a combined light beam 60. The combined light beam 60 includes light having a first waveband and light having a second waveband, and the combined light beam 60 may also include light having a third waveband or/and light having a fourth waveband. For example, in the embodiment, a peak value of the first waveband is greater than a peak value of the second waveband, a peak value of the third waveband is between the peak value of the first waveband and the peak value of the second waveband, and a peak value of the fourth waveband is between the peak value of the first waveband and the peak value of the third waveband. To be more specific, in the embodiment, a range of the first waveband is between 564 nm and 680 nm, a range of the third waveband is between 439 nm and 636 nm, a range of the second waveband is between 415 nm and 495 nm, and a range of the fourth waveband is between 439 nm and 680 nm. Namely, in the embodiment, the first waveband is a red light waveband, the second waveband is a blue light waveband, the third waveband is a green light waveband, and the fourth waveband is a yellow light waveband.

Moreover, as shown in FIG. 2, the filter module 100 includes a transparent substrate 130, a filter layer 110 and a diffusion layer 120. For example, in the embodiment, the filter layer 110 may be a coating, which allows light of a specific waveband to pass through, and the diffusion layer 120 may be diffusion microstructures, which diffuse and uniform the light passing there through. The diffusion layer 120 is disposed on a side of the filter module 100 opposite to the filter layer 110. To be specific, as shown in FIG. 2, the transparent substrate 130 has a first surface S1 and a second surface S2 opposite to each other, where the first surface S1 faces the light combining module 210, and the second surface S2 faces the light uniforming element 220, where the filter layer 110 is disposed on one of the first surface S1 and the second surface S2, and the diffusion layer 120 is disposed on the other one of the first surface S1 and the second surface S2. In this way, by disposing the diffusion layer 120 and the filter layer 110 on the two opposite sides of the filter module 100, damage of a coating surface of the filter layer 110 due to configuration of the diffusion layer 120 or a poor diffusion effect of the diffusion layer 120 due to configuration of the coating surface of the filter layer 110 may be avoided.

For example, as shown in FIG. 2, in the embodiment, the filter layer 110 is disposed on the first surface S1, and the diffusion layer 120 is disposed on the second surface S2. In this way, the combined light beam 60 may sequentially pass through the filter layer 110, the transparent substrate 130 and the diffusion layer 120, but the invention is not limited thereto. In other embodiment, the filter layer 110 may be disposed on the second surface S2, and the diffusion layer 120 is disposed on the first surface S1, and in such case, the combined light beam 60 may sequentially pass through the diffusion layer 120, the transparent substrate 130, and the filter layer 110.

Further, in FIG. 3, in the embodiment, the filter layer 110 includes a first filter region FR1, a second filter region FR2, a third filter region FR3, and a fourth filter region FR4. Moreover, the first filter region FR1 allows light having the first waveband (the red light) to pass through and filters light of other wavebands, the second filter region FR2 allows light having the second waveband (the blue light) to pass through and filters light of other wavebands, the third filter region FR3 allows light having the third waveband (the green light) to pass through and filters light of other wavebands, and the fourth filter region FR4 allows light having the fourth waveband (the yellow light) to pass through and filters light of other wavebands. Namely, in the embodiment, the first filter region FR1 is a red light filter region, the second filter region FR2 is a blue light filter region, the third filter region FR3 is a green light filter region, and the fourth filter region FR4 is a yellow light filter region.

On the other hand, as shown in FIG. 4, in the embodiment, the diffusion layer 120 includes a first diffusion portion DP1, a second diffusion portion DP2, a third diffusion portion DP3, and a fourth diffusion portion DP4. In FIGS. 2, 3 and 4, in the embodiment, the filter module 100 may be a filter wheel which is able to rotate around a center axis (not shown) thereof. The first filter region FR1, the second filter region FR2, the third filter region FR3, and the fourth filter region FR4 are disposed around the center axis, and cut into a transmission path of the combined light beam 60 in turn. The first diffusion portion DP1, the second diffusion portion DP2, the third diffusion portion DP3, and the fourth diffusion portion DP4 are disposed around the center axis. Moreover, to be more specific, referring to FIG. 2 to FIG. 4 at the same time, in the embodiment, the first diffusion portion DP1 is disposed corresponding to the first filter region FR1 and may allow the corresponding light having the first waveband (the red light) to pass through, the second diffusion portion DP2 is disposed corresponding to the second filter region FR2 and may allow the corresponding light having the second waveband (the blue light) to pass through, the third diffusion portion DP3 is disposed corresponding to the third filter region FR3 and may allow the corresponding light having the third waveband (the green light) to pass through, and the fourth diffusion portion DP4 is disposed corresponding to the fourth filter region FR4 and may allow the corresponding light having the fourth waveband (the yellow light) to pass through. In this way, the light of different wavebands of the combined light beam 60 may respectively pass through the corresponding first filter region FR1 and the first diffusion portion DP1, the corresponding second filter region FR2 and the second diffusion portion DP2, the corresponding third filter region FR3 and the third diffusion portion DP3, and the corresponding fourth filter region FR4 and the fourth diffusion portion DP4. Therefore, the filter module 100 may respectively adjust the uniformity of the color light in different waveband ranges by controlling haze values of the first diffusion portion DP1, the second diffusion portion DP2, the third diffusion portion DP3, and the fourth diffusion portion DP4.

Further, in the embodiment, the first diffusion portion DP1 has a first haze value, the second diffusion portion DP2 has a second haze value, the third diffusion portion DP3 has a third haze value, and the fourth diffusion portion DP4 has a fourth haze value. Moreover, the first haze value, the third haze value and the fourth haze value are different from the second haze value. Furthermore, in the embodiment, the first haze value is less than the second haze value. The third haze value is less than or equal to the first haze value. The third haze value is preferably less than the first haze value, and the fourth haze value is less than the second haze value. For example, in the embodiment, a ratio of the second haze value to the first haze value ranges between 1.1 and 3.5. Namely, in the embodiment, the range of the ratio of the first haze value to the second haze value falls within 1:(1.1-3.5). Moreover, a range of a ratio of the third haze value to the second haze value falls within 1:(1.1-3.6). A range of a ratio of the fourth haze value to the second haze value falls within 1:(1.1-3.6). In this way, as shown in FIG. 1 and FIG. 2, when the combined light beam 60 is transmitted to the filter module 100, it may be converted by the filter module 100 to form the illumination light beam 70, and the color light of different waveband ranges included in the illumination light beam 70 may also be adjusted to have good uniformity, respectively.

Then, referring to FIG. 1 and FIG. 2 again, in the embodiment, the light uniforming element 220 is located on a transmission path of the illumination light beam 70. For example, the light uniforming element 220 includes an integrating rod, but the invention is not limited thereto. As shown in FIG. 1, when the illumination light beam 70 is transmitted from the filter module 100 of the illumination system 200 to the light uniforming element 220, the light uniforming element 220 may uniform the entire illumination light beam 70 again and transmit it to the light valve 310.

In addition, as shown in FIG. 1, the light valve 310 is located on the transmission path of the illumination light beam 70 and may convert the illumination light beam 70 into an image light beam 80. The projection lens 320 is located on a transmission path of the image light beam 80, and may project the image light beam 80 to a screen (not shown) to form an image. Since after the illumination light beam 70 is incident on the light valve 310, the light valve 310 may convert the illumination light beam 70 into the image light beam 80 of different colors and transmit the image light beam 80 to the projection lens 320, a color image is formed on the screen. For example, in the embodiment, the light valve 310 is, for example, a digital micro-mirror device (DMD) or a liquid-crystal-on-silicon panel (LCOS panel). However, in other embodiments, the light valve 310 may also be a transmissive liquid crystal panel or other light beam modulators. For example, in the embodiment, the projection lens 320 may include one or more lenses.

In this way, in the projection apparatus 300 and the illumination system 200, based on the corresponding configuration of the different filter regions of the filter layer 110 and the different diffusion portions of the diffusion layer 120, the light with different wavebands passing through the filter layer 110 may correspondingly pass through the diffusion portions with different hazes value. In this way, uniformity of the color light in different waveband ranges may be adjusted separately, so that each color light has good uniformity, and thus the subsequently formed illumination light beam 70 has better uniformity. In this way, the illumination system 200 and the projection apparatus 300 using the filter module 100 are able to provide display images with uniform color, thereby improving the image quality and user's visual perception.

Figure 5:
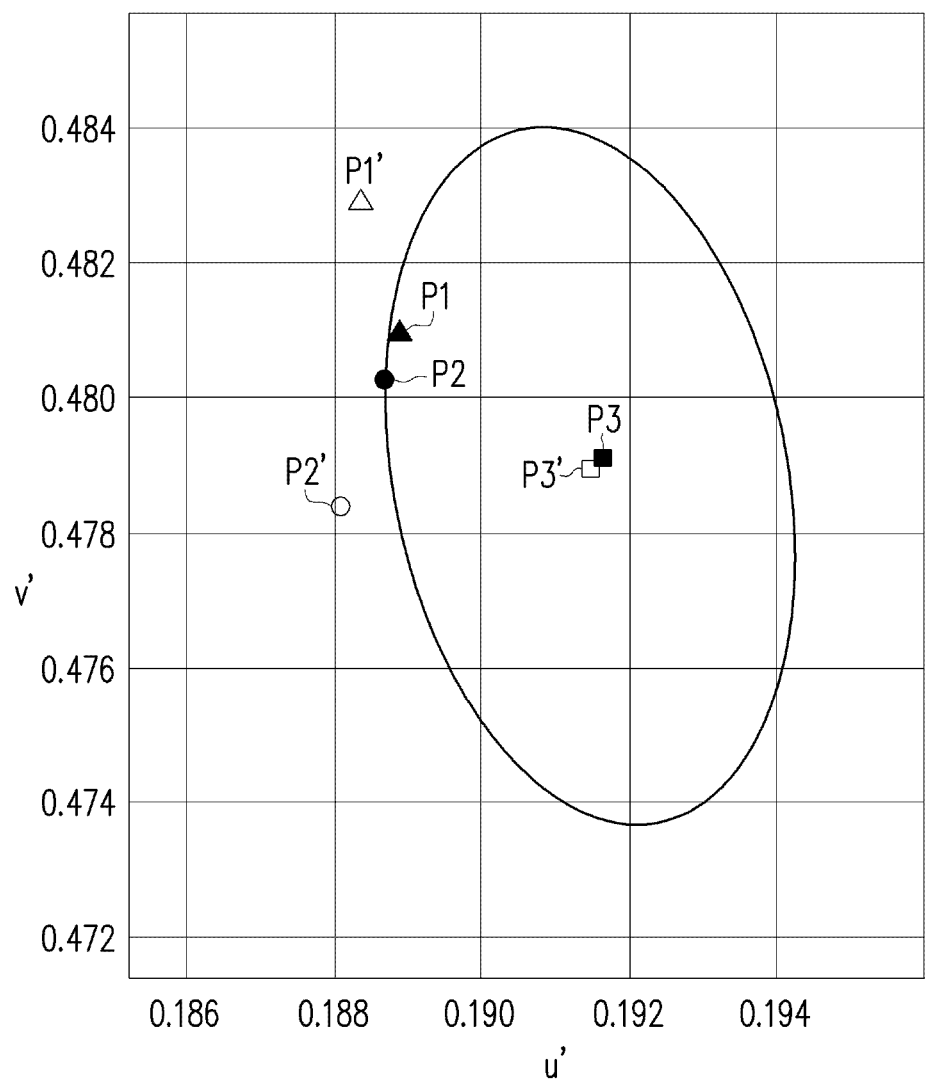
FIG. 5 is a white point distribution diagram of a combined light beam and an illumination light beam in a CIE 1976 UCS chromaticity diagram ('u'v' chromaticity diagram).

FIG. 5 is a white point distribution diagram of the combined light beam 60 and the illumination light beam 70 in a CIE 1976 UCS chromaticity diagram ('u'v' chromaticity diagram). For example, a first position P1', a second position P2', and a third position P3' of FIG. 5 are respectively position distributions of the combined light beam 60 of three white light beams on the CIE 1976 UCS chromaticity diagram before the combined light beam 60 passes through the filter module 100. A first position P1, a second position P2, and a third position P3 are respectively position distributions of the illumination light beam 70 on the CIE 1976 UCS chromaticity diagram, where the illumination light beam 70 is formed by the combined light beam 60 of the three white light beams after passing through the filter module 100. To be specific, when the position of the combined light beam 60 on the CIE 1976 UCS chromaticity diagram falls outside a boundary of a third-order McAdam ellipse shown in FIG. 5 (i.e., located at the first position P1' or the second position P2'), it represents that the white image presented by the combined light beams 60 may have an uneven color, and have a color difference that is just perceptible to human eyes from a standard white image. Further, as shown in FIG. 5, when the position of the illumination beam 70 formed by the combined light beams 60 after passing through the filter module 100 on the CIE 1976 UCS chromaticity diagram may be exactly within the boundary of the third-order MacAdam ellipse (i.e., located at the first position P1, the second position P2 or the third position P3), it means that although there is still a slight color difference between the white image presented by the illumination beams 70 and the standard white image, it is no longer noticeable by the human eyes, so that the white image with good color uniformity may be presented.

It should be noted that in the aforementioned embodiment, although the diffusion layer 120 having four diffusion portions (i.e., the first diffusion portion DP1, the second diffusion portion DP2, the third diffusion portion DP3, and the fourth diffusion portion DP4) is taken as an example for description, the invention is not limited thereto. In other embodiments, the diffusion portions may also be selectively provided as required. For example, if the white image formed by the combined light beam 60 only has red or blue uneven color blocks, only the first diffusion portion DP1 (configured to diffuse light having the first waveband serving as the red light waveband) and the second diffusion portion DP2 (configured to diffuse light having the second waveband serving as the blue light waveband) may be selectively set. Similarly, if the white image formed by the combined light beam 60 has uneven color blocks of color light of other waveband ranges, the diffusion portions configured to diffuse color light of other waveband ranges may be selectively set. In other words, in other embodiments, although each filter region may correspond to a different diffusion portion with different haze value, the numbers of the filter regions and the diffusion portions do not need to correspond to each other, and the corresponding diffusion portions may be provided only on the opposite sides of a part of the filter regions.

Moreover, in the aforementioned embodiment, although the filter layer 110 having four filter regions (i.e., the first filter region FR1, the second filter region FR2, the third filter region FR3, and the fourth filter region FR4) is taken as an example for description, the invention is not limited thereto. In other embodiments, the number of the filter regions may also be determined according to actual requirements, as long as the numbers of the filter regions and the diffusion portions are all greater than two, and the filter regions and the diffusion portions may be used to respectively adjust the uniformity of the color light in different waveband ranges.

In summary, the embodiments of the invention have at least one of following advantages or effects. In the embodiment of the invention, in the projection apparatus and the illumination system, based on the corresponding configuration of different filter regions of the filter layer and different diffusion portions of the diffusion layer, the light with different wavebands passing through different filter regions may correspondingly pass through the diffusion portions with different haze values. In this way, uniformity of the color light in different waveband ranges may be adjusted separately, so that each color light has good uniformity, and thus the subsequently formed illumination light beam has better uniformity. In this way, the illumination system and the projection apparatus using the filter module are able to provide display images with uniform color, thereby improving the image quality and user's visual perception.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A filter module, comprising a transparent substrate, a filter layer and a diffusion layer, wherein:
   the transparent substrate comprises a first surface and a second surface opposite to each other, wherein light enters the transparent substrate from the first surface and leaves the transparent substrate from the second surface;
   the filter layer is disposed on one of the first surface and the second surface, the filter layer comprises a first filter region and a second filter region, the first filter region and the second filter region respectively allow light having a first waveband and light having a second waveband to pass through; and
   the diffusion layer is disposed on the other one of the first surface and the second surface, the diffusion layer is disposed on a side of the filter module opposite to the filter layer and comprises a first diffusion portion with a first haze value and a second diffusion portion with a second haze value, the first diffusion portion is disposed corresponding to and overlapped with the first filter region along an axial direction, and allows the corresponding light having the first waveband to pass through, and the second diffusion portion is arranged corresponding to and overlapped with the second filter region along the axial direction, and allows the corresponding light having the second waveband to pass through, and the first haze value is different from the second haze value.

2. The filter module as claimed in claim 1, wherein a peak value of the first waveband is greater than a peak value of the second waveband, and the first haze value is less than the second haze value.

3. The filter module as claimed in claim 1, wherein a ratio of the second haze value to the first haze value ranges between 1.1 and 3.5.

4. The filter module as claimed in claim 1, wherein the filter layer further comprises a third filter region, the third filter region allows light having a third waveband to pass through, the diffusion layer further comprises a third diffusion portion with a third haze value, the third diffusion portion is disposed corresponding to the third filter region and allows the corresponding light having the third waveband to pass through, a peak value of the third waveband is between a peak value of the first waveband and a peak value of the second waveband, and the third haze value is less than or equal to the first haze value.

5. The filter module as claimed in claim 4, wherein a range of a ratio of the first haze value to the second haze value falls within 1:(1.1-3.5), and a range of a ratio of the third haze value to the second haze value falls within 1:(1.1-3.6).

6. The filter module as claimed in claim 4, wherein the filter layer further comprises a fourth filter region, the fourth filter region allows light having a fourth waveband to pass through, the diffusion layer further comprises a fourth diffusion portion with a fourth haze value, the fourth diffusion portion is disposed corresponding to the fourth filter region and allows the corresponding light having the fourth waveband to pass through, a peak value of the fourth waveband is between the peak value of the first waveband and the peak value of the third waveband, and the fourth haze value is less than the second haze value.

7. The filter module as claimed in claim 6, wherein a range of a ratio of the first haze value to the second haze value falls within 1:(1.1-3.5), a range of a ratio of the third haze value to the second haze value falls within 1:(1.1-3.6), and a range of a ratio of the fourth haze value to the second haze value falls within 1:(1.1-3.6).

8. A projection apparatus, comprising a filter module, a light combining module, a light valve, and a projection lens, wherein
the filter module comprises a transparent substrate, a filter layer and a diffusion layer, wherein:
the transparent substrate comprises a first surface and a second surface opposite to each other, wherein light from the light combining module enters the transparent substrate from the first surface and leaves the transparent substrate from the second surface;
the filter layer is disposed on one of the first surface and the second surface, the filter layer comprises a first filter region and a second filter region, the first filter region and the second filter region respectively allow light having a first waveband and light having a second waveband to pass through; and
the diffusion layer is disposed on the other one of the first surface and the second surface, the diffusion layer is disposed on a side of the filter module opposite to the filter layer and comprises a first diffusion portion with a first haze value and a second diffusion portion with a second haze value, the first diffusion portion is arranged corresponding to and overlapped with the first filter region along an axial direction, and allows the corresponding light having the first waveband to pass through, and the second diffusion portion is arranged corresponding to and overlapped with the second filter region along the axial direction, and allows the corresponding light having the second waveband to pass through, and the first haze value is different from the second haze value;
the light combining module is configured to emit the light having the first waveband and the light having the second waveband, wherein the light having the first waveband and the light having the second waveband are transmitted to the filter module, and converted into an illumination light beam by the filter module;
the light valve is located on a transmission path of the illumination light beam and is configured to convert the illumination light beam into an image light beam; and
the projection lens is located on a transmission path of the image light beam and is configured to project the image light beam.

9. The projection apparatus as claimed in claim 8, wherein a peak value of the first waveband is greater than a peak value of the second waveband, and the first haze value is less than the second haze value.

10. The projection apparatus as claimed in claim 9, wherein a ratio of the second haze value to the first haze value ranges between 1.1 and 3.5.

11. The projection apparatus as claimed in claim 9, wherein the light combining module is further configured to emit light having a third waveband, wherein the light having the third waveband is transmitted to the filter module, and the filter layer further comprises a third filter region, the third filter region allows the light having the third waveband to pass through, the diffusion layer further comprises a third diffusion portion with a third haze value, the third diffusion portion is disposed corresponding to the third filter region and allows the corresponding light having the third waveband to pass through, a peak value of the third waveband is between a peak value of the first waveband and a peak value of the second waveband, and the third haze value is less than or equal to the first haze value.

12. The projection apparatus as claimed in claim 11, wherein a range of a ratio of the first haze value to the second haze value falls within 1:(1.1-3.5), and a range of a ratio of the third haze value to the second haze value falls within 1:(1.1-3.6).

13. The projection apparatus as claimed in claim 11, wherein the light combining module is further configured to emit light having a fourth waveband, wherein the light having the fourth waveband is transmitted to the filter module, and the filter layer further comprises a fourth filter region, the fourth filter region allows the light having the fourth waveband to pass through, the diffusion layer further comprises a fourth diffusion portion with a fourth haze value, the fourth diffusion portion is disposed corresponding to the fourth filter region and allows the corresponding light having the fourth waveband to pass through, a peak value of the fourth waveband is between the peak value of the first waveband and the peak value of the third waveband, and the fourth haze value is less than the second haze value.

14. The projection apparatus as claimed in claim 13, wherein a range of a ratio of the first haze value to the second haze value falls within 1:(1.1-3.5), a range of a ratio of the third haze value to the second haze value falls within 1:(1.1-3.6), and a range of a ratio of the fourth haze value to the second haze value falls within 1:(1.1-3.6).

15. The projection apparatus as claimed in claim 8, further comprising:
 a light uniforming element, wherein the filter module is located between the light uniforming element and the light combining module.

* * * * *